United States Patent
Subramanyam et al.

(10) Patent No.: US 7,030,463 B1
(45) Date of Patent: Apr. 18, 2006

(54) TUNEABLE ELECTROMAGNETIC BANDGAP STRUCTURES BASED ON HIGH RESISTIVITY SILICON SUBSTRATES

(75) Inventors: Guru Subramanyam, Dayton, OH (US); Spartak Gevorgian, Gothenburg (SE)

(73) Assignee: University of Dayton, Dayton, OH (US)

( * ) Notice: Subject to any disclaimer, the term of this patent is extended or adjusted under 35 U.S.C. 154(b) by 0 days.

(21) Appl. No.: 10/857,175

(22) Filed: May 28, 2004

Related U.S. Application Data (60) Provisional application No. 60/507,785, filed on Oct. 1, 2003.

(51) Int. Cl.
*H01L 29/93* (2006.01)
*H01G 5/00* (2006.01)
(52) U.S. Cl. ............ 257/595; 257/600; 257/602; 361/277; 361/281; 361/282; 361/290
(58) Field of Classification Search ............ 257/295, 257/595, 600, 602; 333/205, 207; 361/277, 361/281, 282, 290, 298.2, 298.3; 240/192.18, 240/192.21
See application file for complete search history.

(56) References Cited

U.S. PATENT DOCUMENTS

| 5,640,042 | A | 6/1997 | Koscica et al. |
| 5,689,275 | A | 11/1997 | Moore et al. |
| 6,377,440 | B1 | 4/2002 | Zhu et al. |
| 6,404,614 | B1* | 6/2002 | Zhu et al. ............ 361/277 |
| 6,433,375 | B1 | 8/2002 | Carlsson et al. |
| 6,454,914 | B1* | 9/2002 | Nakamura ........ 204/192.17 |
| 6,525,630 | B1 | 2/2003 | Zhu et al. |
| 2002/0158717 | A1 | 10/2002 | Toncich |
| 2002/0163400 | A1 | 11/2002 | Toncich |
| 2003/0001692 | A1 | 1/2003 | Chiu et al. |
| 2003/0020567 | A1 | 1/2003 | Chappell et al. |

FOREIGN PATENT DOCUMENTS

WO   WO 02/084310 A1   10/2002
WO   WO 02/084685 A1   10/2002

OTHER PUBLICATIONS

D.Kuylenstierna et al., Tunable Electromagnetic Bandgap Strucutres based on BaSrTiO3 parallel-plate varactors on silicon coplanar waveguides, 33 rd European Microwave Conference, Oct. 7-9, 2003, pp. 1111-1114.*

(Continued)

*Primary Examiner*—Donghee Kang
(74) *Attorney, Agent, or Firm*—Dinsmore & Shohl LLP (57) ABSTRACT

Electrically tunable electromagnetic bandgap ("TEBG") structures using a ferroelectric thin film on a semiconductor substrate, tunable devices that include such a TEBG structure, such as a monolithic microwave integrated circuit ("MMIC"), and a method producing such a TEBG structure are disclosed. The present invention provides a semiconductive substrate having an oxide layer, a first conductive layer positioned on the oxide layer, a ferroelectric layer covering the first conductive layer, and a second conductive layer positioned on a surface of the tunable ferroelectric layer. The use of the ferroelectric layer, which have a DC electric field dependent permittivity, enables a small size, tunable EBG structure.

42 Claims, 7 Drawing Sheets

OTHER PUBLICATIONS

D. Kuylenstierna et al., Tunable Electromagnetic Bandgap Structure Based on Ferroelectric films, Antennas and Propagation Society Int. Sys. 2003 IEEE, Jun. 22-27, 2003, pp 879-882.*

Liu et al., "BaSrTiO3 Interdigitated Capacitors for Distributed Phase Shifter Applications", IEEE Microwave Guided Wave Letters, vol. 10, No. 11, Nov. 2000, pp. 448-450.

York et al., "Synthesis and Characterization of (BaxSr1-x)Ti1+yO3+z Thin Films and Integration into Microwave Varactors and Phase Shifters", presented at ISIF 2000 Conference, Aachen, Germany, Mar. 2000 and to appear in Journal of Integrated Ferroelectrics.

A.R. Brown, "A Varactor Tuned RF Filter", Submitted for Review as a short-paper to the IEEE Trans. on MTT, Oct. 29, 1999, pp. 1-4.

York et al., "Microwave Integrated Circuits Using Thin-Film BST", presented at ISAF Conference, Honolulu, Hawaii, Aug. 2000.

Tombak et al., "Voltage-Controlled RF Filters Employing Thin-Film Barium-Strontium-Titanate Tunable Capacitors", IEEE Transactions on Microwave Theory and Techniques, vol. 51, No. 2, Feb. 2003, pp. 462-467.

Jin et al., "Microwave Characterization of Thin Film BST Material Using a Simple Measurement Technique", IEEE MTT-S CDROM (IF-WE-14), 2002, pp. 1201-1204.

Yoon et al., "A Reduced Intermodulation Distortion Tunable Ferroelectric Capacitor: Architecture and Demonstration", accepted in IEEE Trans. Microwave Theory Tech., Dec. 2003.

* cited by examiner

TUNEABLE ELECTROMAGNETIC BANDGAP STRUCTURES BASED ON HIGH RESISTIVITY SILICON SUBSTRATES

CROSS REFERENCE TO RELATED APPLICATIONS

This application claims the benefit of provisional application No. 60/507,785 filed on Oct. 1, 2003.

BACKGROUND OF THE INVENTION

The present invention relates generally to silicon-based structures and in particular, to a room-temperature, electrically tunable electromagnetic bandgap ("TEBG") structure using a ferroelectric thin film on a semiconductor substrate, tunable devices that include such a TEBG structure, such as a monolithic microwave integrated circuit ("MMIC"), and a method producing such a TEBG structure.

Prior art electromagnetic bandgap ("EBG") structures are essentially one-, two-, and three-dimensional metal-dielectric and dielectric—dielectric periodic structures. EBG structures, known also as photonic bandgap ("PBG") crystals, are extensively considered for applications in microwave devices, including filters, multiplexers, phase shifters, and frequency selective surfaces ("FSS"). In EBG structures, electromagnetic waves experience frequency bands, where they cannot propagate, a feature similar to wave (electron, electromagnetic) propagation in physical crystals considered in solid-state physics. These frequency bands are similar to forbidden energy bands in semiconductors.

Prior art EBG structures also exhibit unexpected properties. For example, they may form a "conducting magnetic wall," i.e., a conducting wall where the tangential component of the electric field is rather high, like on the surface of a dielectric. For this reason EBG structures can be used to suppress surface waves in antennas, and substrates in microstrip/coplanar waveguides. Two-dimensional ("2D") EBG crystals in FSS consist of periodic arrays of metallic patch resonators acting as special filters for electromagnetic waves, exhibiting frequency stop bands near resonance of the patches. These filters are used in radomes, in polarization converters, and a number of other military applications. One of the main advantages of EBG structures is their simplicity, and compatibility with printed circuit board ("PCB") technology, making them rather cost effective.

The main disadvantage of prior art EBG structures is their large size (e.g., greater than 3 centimeters) at low microwave frequencies, since the periodicity of the structure is proportional to the wavelength of microwave signal. This makes the applications of EBG structures at lower microwave frequencies (i.e., below 10 GHz) not practical. However, the frequency band 0.5–5.0 GHz is extensively used in microwave (mobile telephony) communications systems, and the frequency band 5.0–10 GHz is being considered for future advanced mobile telephony systems.

SUMMARY OF THE INVENTION

It is in view of the above mentioned background, that the present invention provides a number of unobvious advantages and advancements over the prior art. In particular, the above-mentioned problems are addressed by using high permittivity dielectrics (such as ceramics based on ferroelectrics) in an EBG structure according to the present invention. The present inventors have discovered that the use of low loss ferroelectric ceramics, having permittivity up to several thousand, enables a significant reduction in size to the EBG structure of the present invention, since the wavelength in these structures is inversely proportional to the square root of permittivity. Additionally, the use of the ferroelectric ceramics, which have a DC electric field dependent permittivity, enabled the inventors to provide a small size, tunable EBG structure.

In one embodiment, TEBG device performance is provided by using ferroelectric varactors according to the present invention in LC circuits for periodically loading coplanar waveguides ("CPWs"). Additionally, asymmetric or symmetric tuning of the bandgap width is achieved by changing the capacitance of the varactors in the LC circuits.

In another embodiment, TEBG arrays are provided according to the present invention based on silicon substrate CPWs fabricated with thin film SrTiO3 (STO) varactors. The EBGs are designed so that the first band gap starts between 20 and 30 GHz. Up to 10% tuning is achieved, under 20-V DC applied bias, in the TEBG structures. Tunable components are critical for next generation of wireless, and satellite communications for high data rate communication systems.

Although the present invention is not limited to specific advantages or functionality, it is noted by the inventors that the use of ferroelectrics reduces the size of the EBG structures making them practical for lower microwave frequencies, enabling the integration of such EBG structures into silicon substrates, thereby making them cost effective, and most importantly, providing electrical tunability of such EBG structures. Tunable EBGs and FSS embodiments are disclosed which offers MMIC compatible designs for integration with standard Si process technology. Improved bandpass and bandreject filters, improved bandwidth of low profile antennas, are a few promising applications for the tunable EBG circuits proposed. At microwave frequencies, the FSS can be used for antenna systems in fixed as well as mobile services. They can be used as spatial electromagnetic filters for satellite and radar applications.

These, and other features and advantages of the present invention will become apparent from the following detailed description, and the accompanying drawings.

BRIEF DESCRIPTION OF THE DRAWINGS

FIGS. 3A and 3B are dispersion curves of CPW TEBG structures according to the present invention with forbidden/permitted frequency bands, where FIG. 3A shows a first Brillouin zone and FIG. 3B shows extended zone schemes in terms of the frequency-dependent propagation constant.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiment(s) of the present invention.

DETAILED DESCRIPTION OF THE VARIOUS EMBODIMENTS

The present invention describes ferroelectric tunable electromagnetic band ("TEBG") structures useful for periodically loading coplanar waveguides ("CPWs"). High dielectric permittivity of the ferroelectrics used in the present invention enables reduction of the wavelength in the line and hence the period of the TEBG structures. This helps to reduce the size of the TEBG structures according to the present invention by at least a factor of 2 or more, which pushes the application of TEBG structures to lower range of microwave frequencies, and facilitates the integration of TEBG structures into semiconductor substrates at millimeter/sub-millimeter waves.

Additionally, the TEBG structures according to the present invention may be operated in an environment having a temperature range of between about 77K to about 330K. Furthermore, the TEBG structures according to the present invention can handle up to 3 megavolts per centimeter, or in one embodiment, which provides a 40 µm gap between conductors provided on a 0.3 µm ferroelectric film, can handle up to 100 watts before overheating or burning out if a TEBG structure is forward or reverse biased with excessive voltage.

Figure 1A:
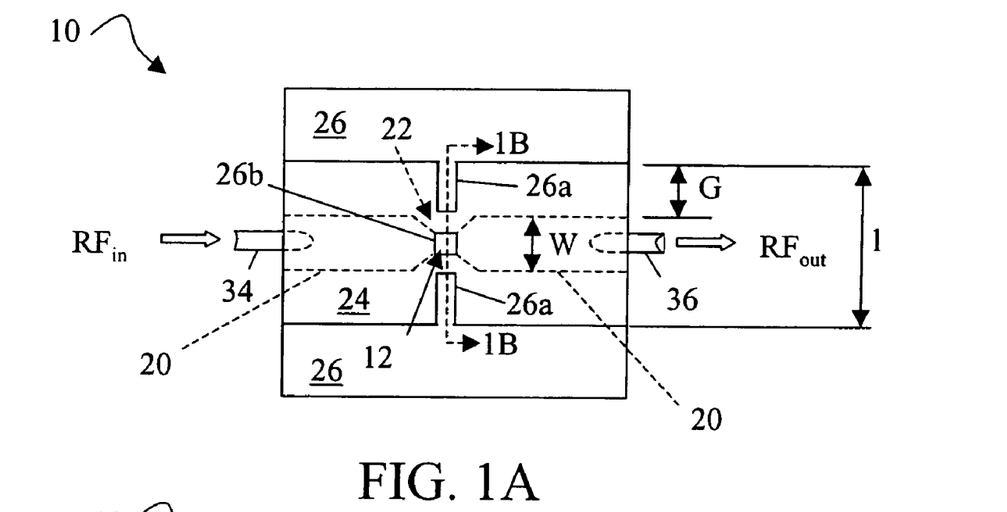
FIG. 1A is a top view of one embodiment of a tunable electromagnetic bandgap ("TEBG") structure based on a high resistivity silicon substrate and showing periodic loading of a coplanar waveguide ("CPW") line using an included ferroelectric varactor according to the present invention.
Figure 1B:
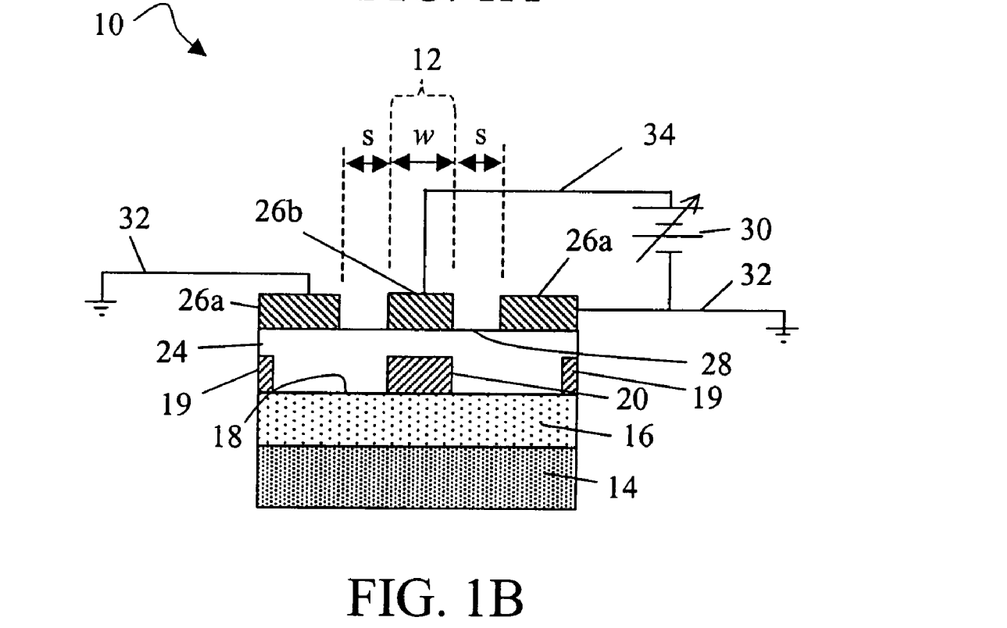
FIG. 1B is a cross-sectional view along section line 1B—1B shown in FIG. 1A.

Referring to the drawings, FIGS. 1A and 1B are top and cross sectional views of a TEBG 10 comprising a ferroelectric varactor, generally indicated by symbol 12, constructed in accordance with the present invention. As illustrated in FIG. 1B, the TEBG 10 includes a substrate 14, such as a high resistivity Si (ρ=5 kΩcm or more), providing an oxide layer 16 with a generally planar top surface 18, and has a permittivity of less than about 4. In one embodiment, the oxide layer 16 comprises silicon dioxide. In other embodiments other suitable semiconductive oxides may be used. The oxide layer 16 may be grown or deposited and mechanically planarized. In one embodiment, the oxide layer 16 has a layer thickness in the range of about 0.01 µm to about 0.5 µm.

A first conductive layer is provided on the generally planar top surface 18. As illustrated, the first conductive is provided in a pattern to provide bottom electrodes 19 of a ground plane and a signal strip 20 therebetween. The first conductive layer is also patterned to provide a narrow region 22 to the signal strip 20. The bottom electrodes 19 and signal strip 20 in one embodiment is platinum, and in other embodiments may comprise a metal selected from Periodic Table Group I, III, and VIII elements, such as gold, copper, silver, aluminum, etc., and combinations thereof. The bottom electrodes 19 and signal strip 20 may patterned either by photolithography or deposition and etching, and have a layer thickness in the range of about 0.1 µm to about 1 µm.

A tunable ferroelectric layer 24 is provided over the signal strip 20 and remaining portions of the top surface 18 of the oxide layer 16. For the purposes of this invention, a low permittivity is a permittivity of less than 200. The tunable ferroelectric layer is comprised of a material having a high permittivity in a range from about 200 to about 2000, and having a tunability in the range from about 10% to about 80% at a bias voltage of about 10 V/µm. In one embodiment, the tunable ferroelectric layer 24 is comprised of Barium-Strontium Titanate, $Ba_xSr_{1-x}TiO_3$ (BSTO), where x can range from zero to one, or BSTO-composite ceramics. Examples of such BSTO composites include, but are not limited to: BSTO—MgO, BSTO—$MgAl_2O_4$, BSTO—$CaTiO_3$, BSTO—$MgTiO_3$, BSTO—$MgSrZrTiO_6$, and combinations thereof. However, it is to be appreciated that other materials in the perovskite family may be used in other embodiments. The tunable ferroelectric layer in one embodiment has a dielectric permittivity greater than 200 when subjected to typical DC bias voltages, for example, voltages ranging from about 5 volts to about 300 volts. The tunable ferroelectric layer 24 is deposited, and then mechanically planarized.

A second conductive layer is provided on the generally planar upper surface 28 of the tunable ferroelectric layer 24, and forms a pair of top electrodes 26 of the ground plane of the TEBG structure 10. The second conductive layer is patterned using photolithography or etching, such that a pair of integral inductive strips 26a extend away from respective top electrodes 26 towards a separated portion of the conductive layer, which defines an upper electrode 26b of the varactor 12. The second conductive layer has a layer thickness in the range of about 0.3 µm to about 1 µm. In the cross section of the varactor 12 shown by FIG. 1B, the layer thickness of the ferroelectric layer 24 between the two overlapping conductive layers is a value in the range from about 0.3 µm to about 2 µm.

A first spacing s is provided between portions 26a and 26b of the second conductive layer 26. A second spacing I is provided between the non-inductive strip portions of the ground plane 26, and represents the width of a CPW. The second conductive layer 26 in one embodiment is a composition of gold and platinum, and in other embodiments may comprise a metal selected from Periodic Table Group I, III and VIII elements, such as gold, copper, silver, aluminum, and combinations thereof. In one embodiment, the first spacing s is in a value in the range from about 0.5 µm to about 2 µm, and the varactor width w is a value in the range of about 0.1 µm to about 10 µm. In one embodiment, the second spacing l is a value in the range of about 10 µm to about 1200 µm. Additionally, in one embodiment, a separation or slotwidth G of the ground planes 26 is a value in the range of 1 µm to about 400 µm, and the signal strip width is a value in the range of about 1 µm to about 400 µm.

A controllable voltage source 30 is connected by lines 32 and 34 to the ground plate portions 26a and electrode 26b of the varactor 12, respectively. The voltage source 30 is used to supply a DC bias voltage to the ferroelectric layer 24, thereby controlling the permittivity of the layer, and hence the capacitance of the varactor and the TEBG structure performance of the periodically loaded CPW. The TEBG structure 10 also includes an RF input 36 and an RF output 38. The RF input and output 36 and 38 are connected to the signal strip 20 by soldered or bonded connections.

It is to be appreciated that in the illustrated TEBG structure 10, the shunt loading capacitor of the circuit also has a series inductance due to a physical line shunting to ground. Additional series inductance is included due to the inductive strips 26a. In one embodiment, a plurality of TEBG structures 10 is provided which uses the ferroelectric varactors 12 for periodic loading of CPW lines. The periodic loading is introduced by the ferroelectric varactor 12 in the overlap region of electrode 26b and the narrow region 22 of the signal strip 20. In one embodiment, the spacing s provides for impedance matching to 50 ohms. In other embodiments, other impendence matching can be provided as character impedance is determined by using the ratio of the varactor width w divided by the sum of the varactor width plus twice the width of spacing s between portion 26a and 26b. Accordingly, for a desired capacitance, width w and spacing s can be determined experimentally, or through computer simulation.

Figure 2:
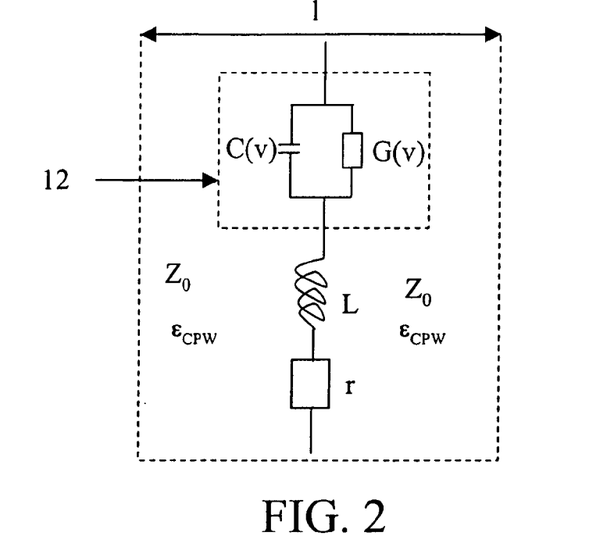
FIG. 2 is a depiction of an equivalent circuit of a unit cell of a TEBG embodiment according to the present invention.

The equivalent circuit of a unit cell of the TEBG structure 10 is shown in FIG. 2. It consists of a CPW of length 1, characteristic impedance $Z_O$, and effective permittivity $\epsilon_{CPW}$, loaded by a ferroelectric varactor in the middle of the line. In this unit cell example, one is the period of the EBG. The varactor is represented by its voltage dependent capacitance C(V) and shunt conductance G(V) (losses). The inductance L may be parasitic. Because the inductive strips 26a are used to form a voltage tunable series resonator, the losses in the inductor are denoted by r. The length of the unit cell is $1=\lambda_g/2$.

In general, the EBG performance of the periodically loaded CPW array may be described by the following dispersion equation (1):

$$\cos[\beta(V)l] = \cos kl - \frac{B(V)}{2}\sin kl \quad (1)$$

where $$k = (\omega\sqrt{\epsilon_{CPW}})/c_0$$

is the propagation constant for regular sections of the CPW, $\omega$ is the angular frequency, and $\beta(V)=\omega/v_{ph}$ is the propagation constant in an infinitely long line periodically loaded by admittance B(V), which is described by the following equation (2):

$$B(V) = -\left[\omega L - \frac{1}{\omega C(V)}\right]^{-1} Z_0 \quad (2)$$

where $c_0=3\times 10^8$ m/s, $v_{ph}$ is the phase velocity in the periodically loaded line.

The resonance frequency of the LC circuit is described by the following equation (3):

$$f_{LC}(V) = \frac{1}{2\pi\sqrt{LC(V)}} \quad (3)$$

Below $f_{LC}$, the admittance (2) of the LC circuit is capacitive, while above $f_{LC}$, it is inductive. In other words, below $f_{LC}$, the CPW is capacitive loaded, and above it is inductively loaded. In general, the LC circuit may be designed to resonate at any desired frequency, including rejection and transmission bands of the EBG. In the first case, it will enhance the rejection level in the bandgap of the EBG, while in the second case it will suppress the transmission in the passband. In the following section, the effects of such loading are discussed in greater detail.

Figure 3A:
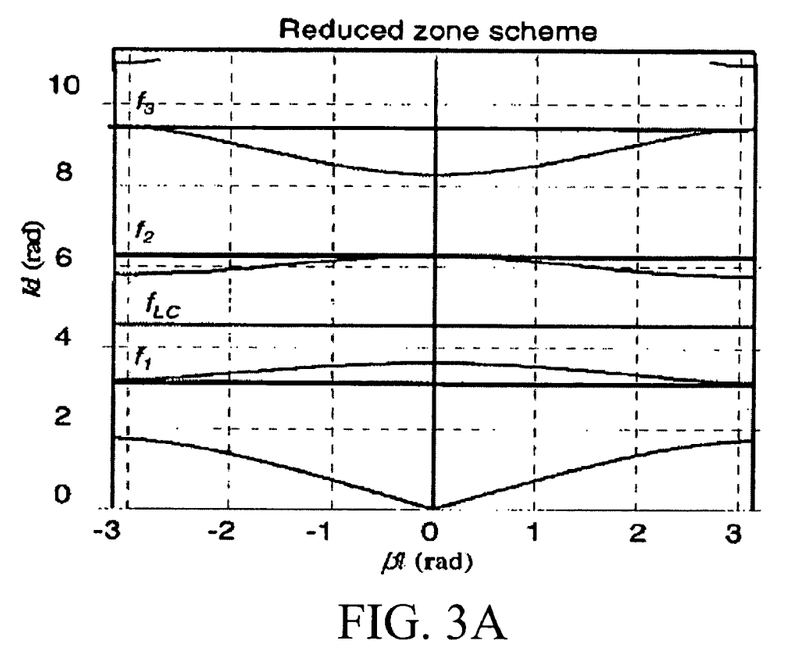

The dispersion equation (1) is used to simulate f versus βl dependence for an EBG CPW. FIG. 3A clearly shows Brillouin bandgaps (as they are known in solid-state physics), and horizontal straight lines mark the Bragg frequencies, multiples of half wavelength resonance, in the CPW sections (with length 1) between the LC circuits. which is described by equation (4):

$$f_n = n\frac{c_0}{2l\sqrt{\epsilon_{CPW}}}, n = 1, 2, 3, \ldots \quad (4)$$

Figure 3B:
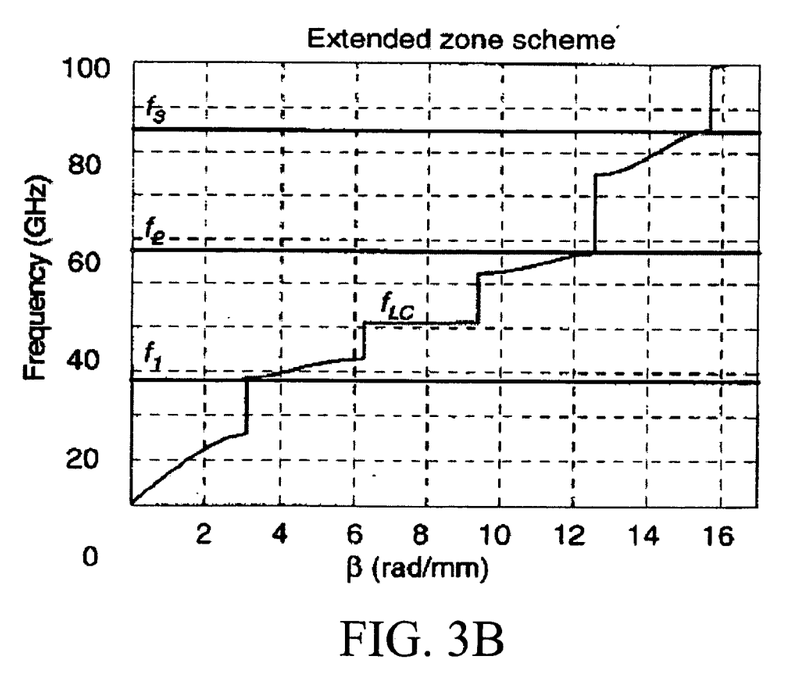

FIG. 3A also shows $f_{LC}$=41 GHz, corresponding to an inductance L=0.05 nH and a capacitance C=0.3 pF. Below $f_{LC}$ the LC loads are capacitive, and Eq. (4) specifies the start of the pass bands. Above $f_{LC}$, where the array is inductively loaded, Eq. (4) specifies the start of the bandgaps. An alternative representation of this dispersion relationship, more understandable for a microwave engineer, is shown in FIG. 3B. The frequency bands where the propagation constant is not defined correspond to bandgaps. The resonance frequency of the LC circuits may be tuned by changing the capacitance of the ferroelectric (or other) varactors.

By changing the capacitance the width of the bandgaps are changed according to Eqs. (1) and (2). Only one flank of the pass band is tuned, while the other is fixed at the Bragg frequency, according to Eq. (4). This is illustrated in FIG. 3B, where the Bragg frequencies, calculated from Eq. (4), are marked with horizontal straight lines. In FIG. 3B, $f_{LC}$ is positioned in the second bandgap, while below this frequency the CPW is capacitively loaded, and the horizontal lines mark the fixed starting frequency of the pass bands, that is, the end of the bandgaps. The frequency where the pass bands stop is given by Eq. (1) and can be tuned if the size of the capacitance is changed. Reduction of capacitance causes an upward shift of the low-frequency skirt of the bandgap. Above the resonant frequency $f_{LC}$, the LC loads are inductive and the horizontal lines give the fixed starting frequency of the bandgaps; the stop frequency of the band gaps are given from Eq. (1) and tunes with the varactor.

Reduction of the capacitance causes an upward shift of the high-frequency skirt of the bandgap. If the resonant frequency $f_{LC}$ of the LC resonator, shown in FIG. 3A, is within the bandgap, the decreased varactor capacitance leads to an upwards shift of the complete bandgap (both skirts) almost without distortion. Hence, by selecting the LC parameters, different tuning effects can be obtained. Some of these tuning mechanisms are experimentally demonstrated in the following subsection.

Figure 4:
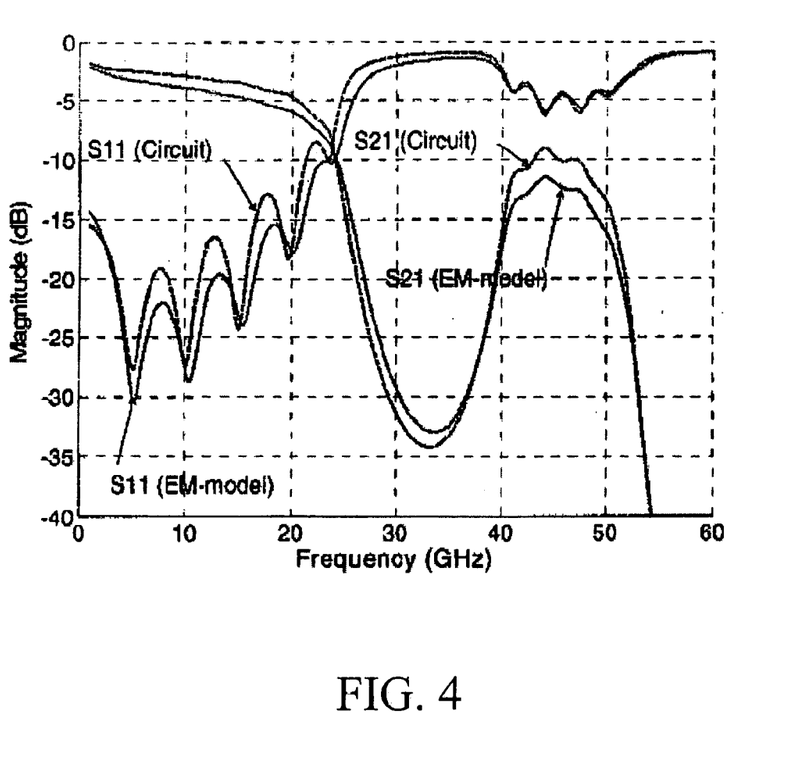
FIG. 4 demonstrates simulated results for a TEBG structure according to the present invention.

FIG. 4 shows the simulated results from an EBG with a unit cell of length l=1400 μm, the width of the signal strip and the slotwidth of the CPW are W=G=40 μm, corresponding to an effective permittivity of $\epsilon_{CPW}$=7. To obtain higher $\epsilon_{CPW}$ (and hence shorter EBG), the thickness and/or permittivity of the ferroelectric film may be increased and/or the slotwidth may be decreased. In the cross section the width of the strips are w=6 μm, that is, the area of the plates in the parallel plate varactor is 36 (μm)², the topology of the varactor is seen in FIG. 1A. The Momentum-simulated ABCD parameters are also used to find the equivalent circuit parameters, using curve fitting (in ADS) to the circuit, as shown in FIG. 2. The following circuit parameters are found for this example: L=0.017 nH, C=0.14 pF, $Z_0$=50 Ω, r=0.2 Ω (calculated from DC resistivity of Pt), and G(V) (calculated from tanδ=0.05 and the dimensions of the capacitor). The results from the equivalent circuit, with matched parameters, are shown in FIG. 4. Good agreement is found with Momentum simulations in this and other cases that follow hereafter.

Figure 6:
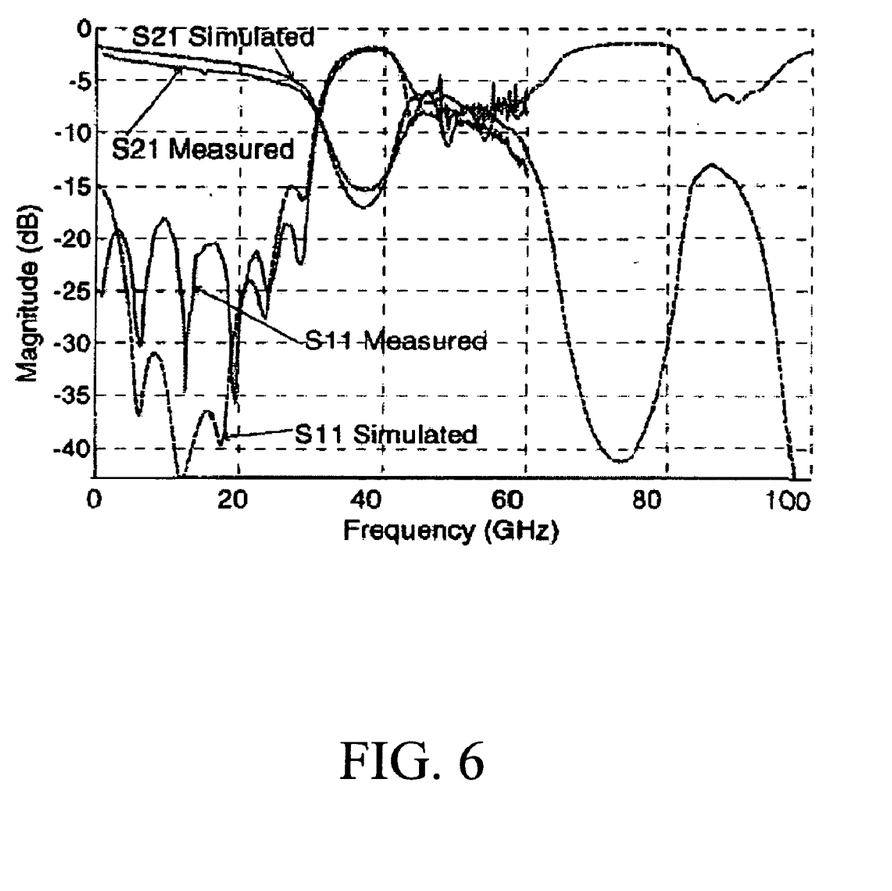
FIG. 6 is measured results of the performance of a TEBG structure according to the present invention.

In further analysis of the EBG performances, the circuit simulator was mainly used, wherein the following example demonstrates how the EBG performance is affected if the capacitance of the ferroelectric varactor is tuned. The EBG is constituted of 2070-μm-long CPW sections shunt loaded by LC circuits. The number of LC circuits is set to be six. In FIG. 6 the circuit simulations are carried out using L=0.05 nH, assuming that (due to the DC bias field) the capacitance of ferroelectric varactors takes the values C (V)=0.3 pF, 0.21 pF, and 0.15 pF, corresponding to capacitance tunability $T_C(V)=[C(0)-C(V)]/C(0)$=50%, and resonant frequencies of Eq.(4) $f_{LC}(V)$=41, 49, and 58 GHz. Below these resonant frequencies, where the LC circuits have capacitive admittance, only the left skirt (low frequency edges of the first bandgap) is tuned due to change a in capacitance. The right skirt of the first bandgap is fixed at 28 GHz, that is, where the period (length 1) of the CPW section corresponds the first Bragg frequency of Eq. (4).

In contrast, the third and fourth bandgaps are above $f_{LC}$, where they have inductive response. In this frequency range, reduction of the capacitance of the varactors, equivalent to increased inductive response of the LC circuit, causes tuning of the high-frequency edges of the bandgaps, without changes in the low frequency edges that are fixed by the Bragg frequencies. This EBG performance for a capacitively loaded line (below resonance of the LC circuits) is also predicted from the dispersion Eq. (1) and FIGS. 3A and 3B.

Figure 5:
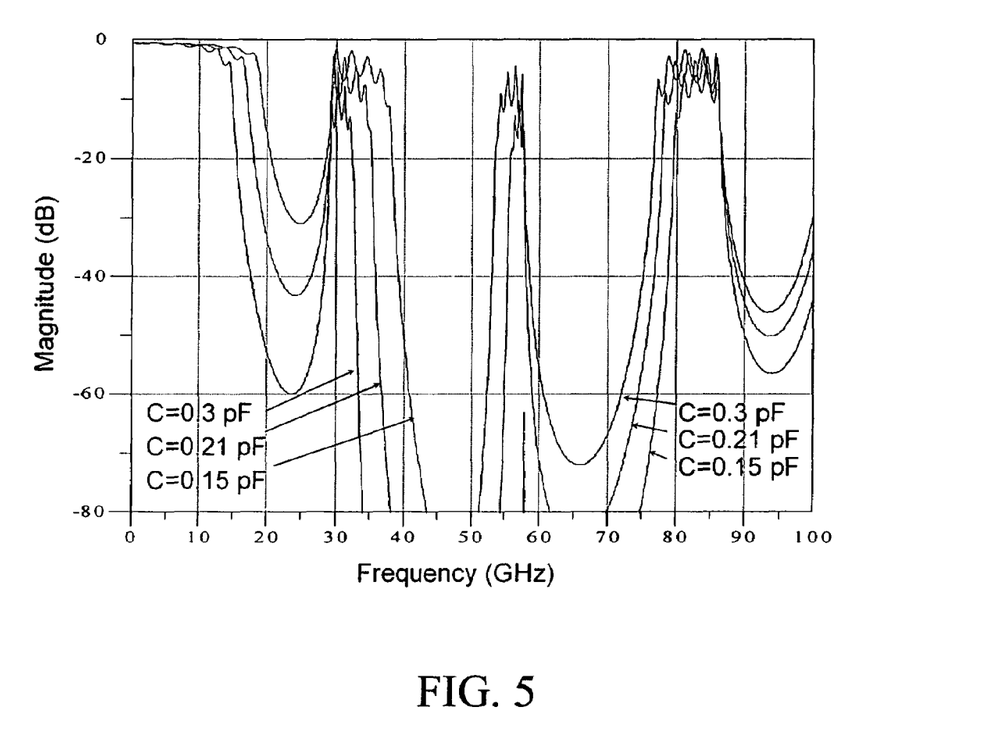
FIG. 5 is simulated results for the tunability of a TEBG structure with change in capacitance according to the present invention.

Furthermore, in this example, the LC circuits are selected so that their resonant frequencies are in the second bandgap. As can be seen from FIG. 5, for small changes of the capacitance (from 0.3 to 0.21 pF, as shown in FIG. 5) the second bandgap (both high-and low-frequency edges) completely shifts towards higher frequencies. FIG. 5 also shows that if the capacitance is reduced even more to C=0.15 pF, the LC resonance coincides with the third passband that practically disappears, and leads to a merging of the second and third bandgaps.

The example shown in FIG. 5 demonstrates the main tuning features of LC-tuned EBGs. The parameters of the LC circuit and the CPW have been selected to demonstrate all these features in one example. However, these parameters are quite realistic, and possible to realize in the proposed CPW lines based on ferroelectric varactors. Ferroelectric varactors with tunability of about 50% are quite possible in today's silicon technology.

Experimentally, measurements were performed on an EDG structure using a Wiltron 360 B network analyzer, in the frequency range from 40–60 GHz. FIG. 6 shows the measured results from an array with period l=1400 μm the slot width and the width of the signal strip are G=W=40 μm the stripwidth at the intersection is w=6 μm. This is the array based on the unit cell shown by FIG. 2. The parameters of the circuit model matching this array are L=0.018 nH and C=0.06 pF, corresponding to $f_{LC}$=153 GHz, which means that they have a capacitive response in the frequency range shown in FIG. 6. Up to 25 GHz, the insertion loss is smaller than 5 dB and the reflection loss larger than 20 dB. On the other hand, the rejection in the first bandgap and the transmission in the second passband are poor, which is associated with increased losses both in regular sections of CPWs and lumped-LC circuits periodically shunting the line. A similar increase of losses in the second passband is observed in experiments with CPW EBG structures.

Figure 7:
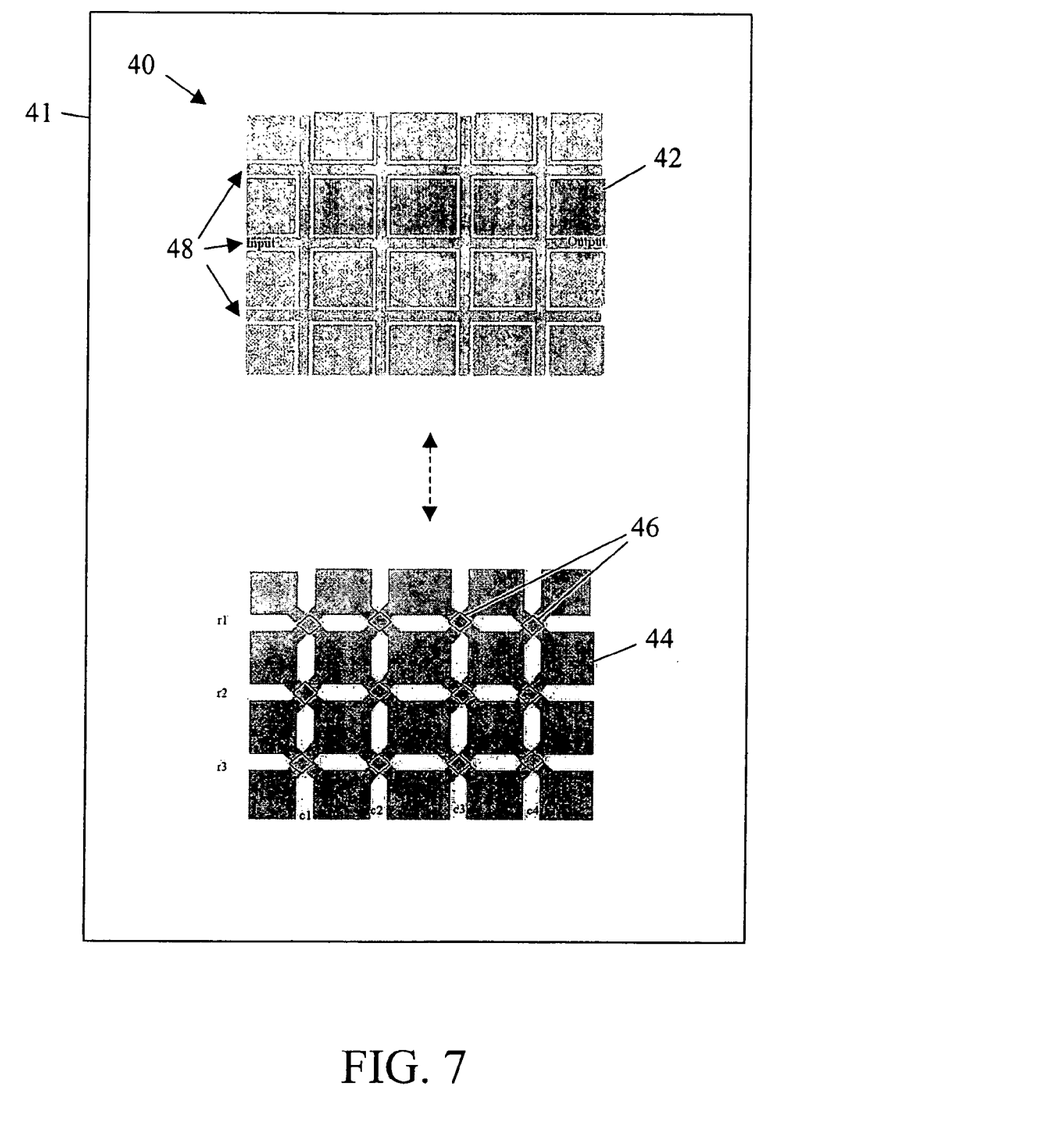
FIG. 7 is an exploded view of a 2D TEBG structure according to the present invention showing a pattern top electrode layer and a patterned bottom electrode layer, wherein said patterned bottom electrode layer is used as a frequency selective surface.

A two dimensional ("2D") tunable electromagnetic bandgap structure 40 based on the same concept discussed in reference to FIGS. 1A and 1B, is shown by FIG. 7. The 2d TEBG structure 40 in one embodiment is included in a monolithic microwave integrated circuit ("MMIC") 41. As illustrated, the 2D TEBG structure 40 shows a patterned top electrode layer 42 and a patterned bottom electrode layer 44. The illustrated diamond areas 46 on the bottom electrode layer 44 define the varactors periodically loading transmission lines 48. In one embodiment, a high quality ferroelectric (e.g. $Ba_xSr_{1-x}TiO_3$) film 43 (best shown in FIG. 8B), is provided on a thick (>0.5 μm) conductive layer, which is patterned on a high resistivity silicon substrate 49 (FIG. 8B) to form the patterned bottom electrode layer 44. To have small DC bias voltages (<20–30 V), the thickness of the ferroelectric film is less than 0.5 μm. In one embodiment, the top electrode layer 42 is deposited on top of ferroelectric film and patterned to complete the 2D TEBG structure 40.

It is to be appreciated that in one embodiment, the bottom electrode layer 44 of the 2D TEBG structure 40 can be used as a frequency selective surface ("FSS") for spatial filtering. In such an embodiment, the FSS comprises of two arrays of patch resonators sandwiching the ferroelectric film, thereby forming a stack. The stack is fabricated on a silicon substrate and serves as a reflective antenna. The FSS consist of periodic arrays of simple patch elements such as dipoles or rings. They exhibit band-stop transmission responses at a frequency $f_r$, where the incident signal is reflected. Using a ferroelectric/dielectric two-layered substrate enables the effective dielectric constant to be electrically tuned, and hence the resonance frequency of the patch elements, making the band-stop transmission response of the FSS electrically tunable.

Figure 8A:
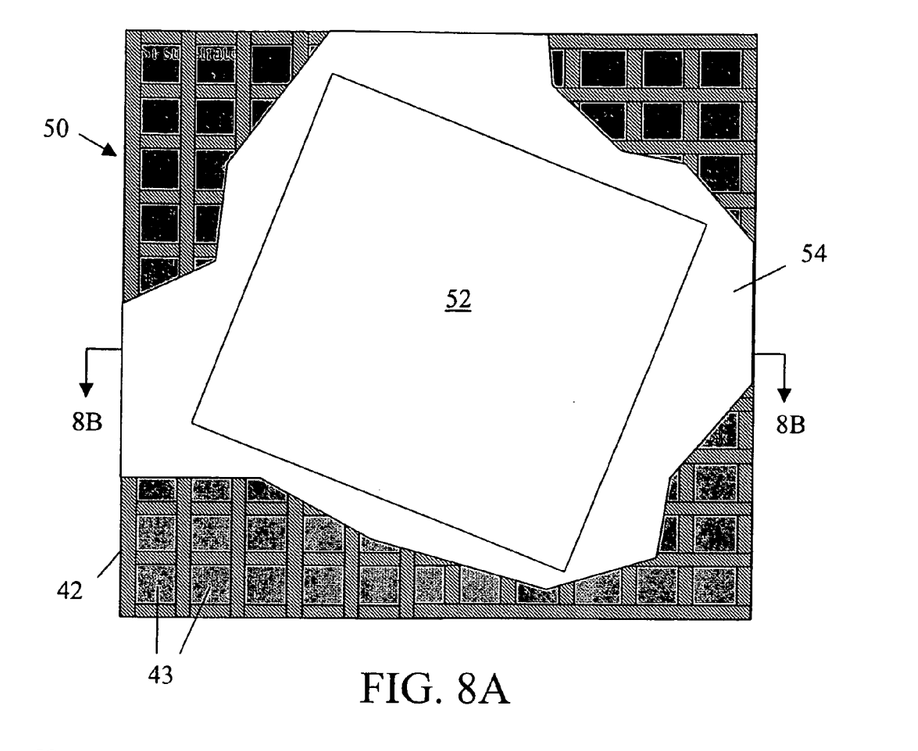
FIG. 8A shows one embodiment of 2D TEBG structures being used as a ground plane for a microstrip circuit according to the present invention.
Figure 8B:
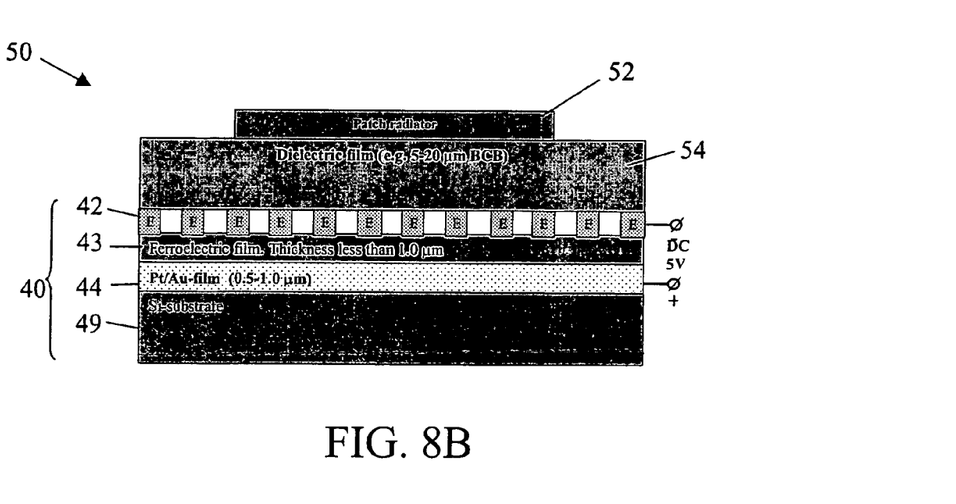
FIG. 8B is a cross-sectional view along section line 8B—8B shown in FIG. 8A.

In another embodiment, the 2D TEBG 40 is used as a ground plane for a microstrip circuit, such as indicated generally by 50 in FIGS. 8A and 8B. For example, 2D TEBG structures according to the present are arranged in the form of lumped element LC networks or resonators incorporating the ferroelectric films. A DC voltage applied between the two electrode structures 42 and 44 changes the permittivity of the ferroelectric film and hence parameters of the LC networks/resonators, i.e. the surface impedance of the 2D TEBG structure 40. Microstrip circuit and/or components, such as a patch radiator 52, are separated from the 2D TEBD structure or "ground plane" 40 by low permittivity low loss dielectric layer 54. In one embodiment, the dielectric layer 54 is a benzocyclobutene based ("BCB") dielectric, and has a thickness in the range of about 5 μm to about 20 μm. In other embodiments, other such suitable dielectric materials with a similar thickness may also be used. Tuning the impedance of ground plane 40 changes the effective permittivity of the microstrip circuit 50 (i.e., resonant frequency of the patches). The wavelength in the 2B TEBG structure 40 is given mainly by the permittivity (typically >100) of the ferroelectric film, while the wavelength in circuit and/or component, such as radiator 52, on top of a dielectric layer 54 is given by permittivity of the dielectric material. In one embodiment, wherein the dielectric layer 54 is a BCB film, the permittivity is about 2.65. Hence, in that illustrative embodiment, the wavelength in a BCB based microstrip 50 is about 10 times larger than that in the 2D TEBG structure 40, and microwave signals therefore "see" a ground plane with effective surface impedance, which is DC bias dependent.

Tunable devices, which use the tunability of the ground plane 40 instead of having tunable components in the microstrip circuit 50, have the following advantages: i) no need in DC decoupling circuits on top of dielectric layer 54; ii) the microstrip circuit 50 is not under DC bias; iii) the (ferroelectric) tuning components are integrated with the silicon substrate 49, i.e. the deign is essentially monolithic; and iv) integration density, reliability, and cost factors are improved over prior art EBGs.

While the invention has been particularly shown and described with reference to the preferred embodiments thereof, it will be understood by those skilled in the art that various changes in form and details may be made without departing from the spirit and scope of the invention.

What is claimed is:

1. An electrically tunable electromagnetic band gap structure comprising:
    a semiconductive substrate having an oxide layer and having generally a planar surface;
    a signal strip provided on the generally planar surface of the oxide layer;
    a tunable ferroelectric layer; and
    a patterned metal layer having ground lines and an electrode on a surface of the tunable ferroelectric layer, said ground lines and said electrode being separated by a gap, and said signal strip and said electrode being separated by the tunable ferroelectric layer provided therebetween.

2. An electrically tunable electromagnetic bandgap structure as recited in claim 1, further comprising a pair of inductive strips provided on a generally planar surface of said tunable ferroelectric layer adjacent said electrode, each said pair of inductive strips and said electrode being separated by a spacing therebetween.

3. An electrically tunable electromagnetic band gap structure as recited in claim 1, further comprising a pair of inductive strips provided on a generally planar surface of said tunable ferroelectric layer adjacent said electrode, each said pair of inductive strips and said electrode being separated by a spacing therebetween, said pair of inductive strip being integral with a respective ground plane, said ground plane having a bottom electrode coplanar with said signal strip and being separated by a slotwidth therebetween.

4. An electrically tunable electromagnetic bandgap structure as recited in claim 1, wherein the tunable ferroelectric layer has a permittivity greater than about 200.

5. An electrically tunable electromagnetic bandgap structure as recited in claim 1, wherein the oxide layer has a permittivity of less than about 4.

6. An electrically tunable electromagnetic bandgap structure as recited in claim 1, wherein the tunable ferroelectric layer has a permittivity in a range from about 200 to about 2000, and a tunability in a range from about 10% to about 80% at a bias voltage of about 10 V/µm.

7. An electrically tunable electromagnetic band gap structure as recited in claim 1, wherein the substrate comprises silicon, and said oxide layer is silicon dioxide.

8. An electrically tunable electromagnetic bandgap structure as recited in claim 1, wherein the tunable ferroelectric layer comprises a perovskite.

9. An electrically tunable electromagnetic band gap structure as recited in claim 1, wherein the tunable ferroelectric layer comprise Barium-Strontium Titanate, $Ba_xSr_{1-x}TiO_3$ (BSTO), where x can range from zero to one.

10. An electrically tunable electromagnetic band gap structure as recited in claim 1, wherein the tunable ferroelectric layer comprise a BSTO-composite ceramic.

11. An electrically tunable electromagnetic bandgap structure as recited in claim 1, wherein the tunable ferroelectric layer comprise BSTO—MgO, BSTO—$MgAl_2O_4$, BSTO—$CaTiO_3$, BSTO—$MgTiO_3$, BSTO—$MgSrZrTiO_6$, and combinations thereof.

12. An electrically tunable electromagnetic bandgap structure as recited in claim 1, further comprising an RF input and an RF output for passing an RF signal through the signal strip under said electrode and in between said tunable ferroelectric layer and said oxide layer.

13. An electrically tunable electromagnetic bandgap structure as recited in claim 1, wherein said electrode and signal strip comprises platinum, gold, copper, silver, aluminum, other Periodic Table Group I, III, and VIII elements, and combinations thereof.

14. An electrically tunable electromagnetic bandgap structure as recited in claim 1, provided in a monolithic microwave integrated circuit.

15. An electrically tunable electromagnetic bandgap structure as recited in claim 1, wherein said structure is used in a reflective antenna.

16. An electrically tunable electromagnetic bandgap structure as recited in claim 1, wherein said structure is used as a ground plane for a microstrip circuit.

17. An electrically tunable electromagnetic bandgap structure as recited in claim 1, wherein said structure is used as a frequency selective surface ("FSS") for spatial filtering.

18. A method of forming an electrically tunable electromagnetic bandgap structure, said method comprising:
    providing a semiconductive substrate having an oxide layer and having generally a planar surface;
    providing a signal strip on said generally planar surface of the oxide layer;
    providing a tunable ferroelectric layer; and
    providing a patterned metal layer having ground lines and an electrode on a surface of the tunable ferroelectric layer, said ground lines and said electrode being separated by a gap, and said signal strip and said electrode being separated by the tunable ferroelectric layer provided therebetween.

19. The method of forming an electrically tunable electromagnetic bandgap structure as recited in claim 18, further comprises providing a pair of inductive strips on a generally planar surface of said tunable ferroelectric layer adjacent said electrode, each said pair of inductive strips and said electrode being separated by a spacing therebetween.

20. The method of forming an electrically tunable electromagnetic bandgap structure as recited in claim 18, further comprises providing a pair of inductive strips on a generally planar surface of said tunable ferroelectric layer adjacent said electrode, each said pair of inductive strips and said electrode being separated by a spacing therebetween, said pair of inductive strip being integral with a respective ground plane, said ground plane having a bottom electrode coplanar with said signal strip and being separated by a slotwidth therebetween.

21. The method of forming an electrically tunable electromagnetic bandgap structure as recited in claim 18, wherein the tunable ferroelectric layer has a permittivity greater than about 200.

22. The method of forming an electrically tunable electromagnetic bandgap structure as recited in claim 18, wherein the oxide layer has a permittivity of less than about 4.

23. The method of forming an electrically tunable electromagnetic bandgap structure as recited in claim 18, wherein the tunable ferroelectric layer has a permittivity in a range from about 200 to about 2000, and a tunability in a range from about 10% to about 80% at a bias voltage of about 10 V/μm.

24. The method of forming an electrically tunable electromagnetic bandgap structure as recited in claim 18, wherein the substrate comprises silicon, and said oxide layer is silicon dioxide.

25. The method of forming an electrically tunable electromagnetic bandgap structure as recited in claim 18, wherein the tunable ferroelectric layer comprises a perovskite.

26. The method of forming an electrically tunable electromagnetic bandgap structure as recited in claim 18, wherein the tunable ferroelectric layer comprise Barium-Strontium Titanate, $Ba_xSr_{1-x}TiO_3$ (BSTO), where x can range from zero to one.

27. The method of forming an electrically tunable electromagnetic bandgap structure as recited in claim 18, wherein the tunable ferroelectric layer comprise a BSTO-composite ceramic.

28. The method of forming an electrically tunable electromagnetic bandgap structure as recited in claim 18, wherein the tunable ferroelectric layer comprise BSTO—MgO, $BSTO—MgAl_2O_4$, $BSTO—CaTiO_3$, $BSTO—MgTiO_3$, $BSTO—MgSrZrTiO_6$, and combinations thereof.

29. The method of forming an electrically tunable electromagnetic band gap structure as recited in claim 18, further comprises providing an RF input and an RF output for passing an RF signal through the signal strip under said electrode and in between said tunable ferroelectric layer and said oxide layer.

30. The method of forming an electrically tunable electromagnetic bandgap structure as recited in claim 18, wherein said electrode and signal strip comprises platinum, gold, copper, silver, aluminum, other Periodic Table Group I, III, and VIII elements, and combinations thereof.

31. The method of forming an electrically tunable electromagnetic band gap structure as recited in claim 18, further comprises including said structure in a monolithic microwave integrated circuit.

32. The method of forming an electrically tunable electromagnetic bandgap structure as recited in claim 18, further comprises including said structure in a reflective antenna.

33. The method of forming an electrically tunable electromagnetic bandgap structure as recited in claim 18, further comprises using said structure used as a ground plane for a microstrip circuit.

34. The method of forming an electrically tunable electromagnetic band gap structure as recited in claim 18, further comprises using said structure as a frequency selective surface ("FSS") for spatial filtering.

35. An electrically tunable electromagnetic bandgap structure comprising:
a substrate having a first permittivity and having a generally planar surface;
first, second, and third electrodes positioned on the generally planar surface of the substrate, said first, second, and third electrodes being separated to form a pair of first gaps therebetween;
a tunable dielectric layer positioned on the first, second, and third electrodes and in said first gaps, the tunable dielectric layer having a second permittivity greater than said first permittivity, and said second electrode being a signal strip; and
fourth, fifth, and sixth electrodes positioned on a surface of the tunable dielectric layer, said fourth, fifth, and sixth electrodes being opposite the first, second, and third electrodes, and said fourth, fifth, and sixth electrodes being separated by a second gap therebetween.

36. An electrically tunable electromagnetic bandgap structure as recited in claim 35, wherein said second gap is narrower than said each one of said pair of first gaps.

37. An electrically tunable electromagnetic bandgap structure as recited in claim 35, wherein said second permittivity is in a range from about 200 to 2000, and tunability of the tunable dielectric layer is in a range from about 10% to about 80%.

38. An electrically tunable electromagnetic bandgap structure as recited in claim 35, wherein said first permittivity is less than about 4.

39. An electrically tunable electromagnetic bandgap structure as recited in claim 35, wherein said electrodes each comprise one of the group of platinum, gold, copper, silver, aluminum, other Periodic Table Group I, III, and VIII elements, and combinations thereof.

40. An electrically tunable electromagnetic bandgap structure as recited in claim 35, wherein the tunable ferroelectric layer comprises a perovskite.

41. An electrically tunable electromagnetic bandgap structure as recited in claim 35, further including an RF input and an RF output for passing an RF signal through the tunable dielectric layer in a first direction, and wherein the first and second gaps lie parallel to the first direction.

42. An electrically tunable electromagnetic bandgap structure as recited in claim 35, wherein said second and fifth electrodes are aligned vertically and have a similar width w.

* * * * *